United States Patent [19]
Collins

[11] Patent Number: 5,903,630
[45] Date of Patent: May 11, 1999

[54] METHOD AND APPARATUS FOR SPECIFYING ALPHANUMERIC INFORMATION WITH A TELEPHONE KEYPAD

[75] Inventor: Gregg Collins, Los Angeles, Calif.

[73] Assignee: Movo Media, Inc., Los Angeles, Calif.

[21] Appl. No.: 08/885,194

[22] Filed: Jun. 30, 1997

[51] Int. Cl.[6] ................................................. H04M 3/42
[52] U.S. Cl. ................................... 379/88.24; 379/93.27
[58] Field of Search ........................... 379/52, 67.1, 71, 379/77, 88.16, 88.22, 88.24, 92.01, 92.02, 93.12, 93.13, 93.18, 93.26, 93.27, 201, 350, 353, 386; 704/270, 271, 272, 277

[56] References Cited

U.S. PATENT DOCUMENTS

| | | | |
|---|---|---|---|
| Re. 30,579 | 4/1981 | Goldman et al. | 340/825.33 |
| Re. 30,580 | 4/1981 | Goldman et al. | 340/825.33 |
| 3,979,057 | 9/1976 | Katz et al. | 364/706 |
| 3,979,058 | 9/1976 | Katz et al. | 364/706 |
| 4,149,246 | 4/1979 | Goldman | 364/470.03 |
| 4,307,266 | 12/1981 | Messina | 379/88.23 |
| 4,427,848 | 1/1984 | Tsakanikas | 379/88.16 |
| 4,558,318 | 12/1985 | Katz et al. | 340/825.34 |
| 4,649,563 | 3/1987 | Riskin | 379/93.27 |
| 4,650,927 | 3/1987 | James | 379/93.18 |
| 4,651,150 | 3/1987 | Katz et al. | 340/825.34 |
| 4,677,659 | 6/1987 | Dargan | 379/93.27 |
| 4,737,980 | 4/1988 | Curtin et al. | 379/93.18 |
| 4,739,322 | 4/1988 | Katz et al. | 340/825.34 |
| 4,792,968 | 12/1988 | Katz | 379/92.03 |
| 4,816,824 | 3/1989 | Katz et al. | 340/825.34 |
| 4,817,129 | 3/1989 | Riskin | 379/88.24 |
| 4,845,739 | 7/1989 | Katz | 379/92.03 |
| 4,866,759 | 9/1989 | Riskin | 379/93.27 |
| 4,918,721 | 4/1990 | Hashimoto | 379/93.18 |
| 4,930,150 | 5/1990 | Katz | 379/92.03 |
| 4,932,046 | 6/1990 | Katz et al. | 379/32 |
| 4,939,773 | 7/1990 | Katz | 379/204 |
| 4,975,945 | 12/1990 | Carbullido | 379/212 |
| 4,987,590 | 1/1991 | Katz | 379/204 |
| 5,014,298 | 5/1991 | Katz | 379/93.12 |
| 5,016,270 | 5/1991 | Katz | 379/92.03 |
| 5,031,206 | 7/1991 | Riskin | 379/93.27 |
| 5,048,075 | 9/1991 | Katz | 379/92.03 |
| 5,073,929 | 12/1991 | Katz | 379/93.12 |
| 5,091,933 | 2/1992 | Katz | 379/204 |
| 5,109,404 | 4/1992 | Katz et al. | 379/88.25 |
| 5,117,455 | 5/1992 | Danish | 379/368 |
| 5,128,984 | 7/1992 | Katz | 379/92.03 |
| 5,185,787 | 2/1993 | Katz | 379/204 |
| 5,204,894 | 4/1993 | Darden | 379/88.03 |
| 5,218,631 | 6/1993 | Katz | 463/41 |
| 5,224,153 | 6/1993 | Katz | 379/93.12 |
| 5,251,252 | 10/1993 | Katz | 379/92.03 |
| 5,255,309 | 10/1993 | Katz | 379/88.09 |
| 5,259,023 | 11/1993 | Katz | 379/88.09 |
| 5,297,197 | 3/1994 | Katz | 379/204 |
| 5,305,205 | 4/1994 | Weber et al. | 364/419.1 |
| 5,337,347 | 8/1994 | Halstead-Nussloch et al. | 379/88.14 |
| 5,339,358 | 8/1994 | Danish et al. | 379/368 |
| 5,349,633 | 9/1994 | Katz | 379/88.09 |
| 5,351,285 | 9/1994 | Katz | 379/93.14 |
| 5,359,645 | 10/1994 | Katz | 379/93.12 |
| 5,365,575 | 11/1994 | Katz | 379/93.13 |
| 5,392,338 | 2/1995 | Danish et al. | 379/93.27 |
| 5,412,708 | 5/1995 | Katz | 348/14 |

(List continued on next page.)

*Primary Examiner*—Scott L. Weaver
*Attorney, Agent, or Firm*—Stephen C. Glazier

[57] ABSTRACT

The present invention uses a conventional telephone keypad to input alphanumeric information, wherein the user follows directions in automatically generated audio prompts heard over the telephone, to take appropriate action to provide the necessary alphanumeric information in an easy and convenient manner. No prior knowledge of the invention or training of the user is required. User input is confirmed in audio as the keypad is used, and the alphanumeric meaning of the input is confirmed in audio when such input is complete. The information is logged into a memory and added to a translation database if the information is not present in the translation database when the user confirms the alphanumeric meaning.

35 Claims, 6 Drawing Sheets

U.S. PATENT DOCUMENTS

| | | | |
|---|---|---|---|
| 5,442,688 | 8/1995 | Katz | 379/156 |
| 5,467,392 | 11/1995 | Norimatsu | 379/354 |
| 5,495,284 | 2/1996 | Katz | 348/15 |
| 5,548,634 | 8/1996 | Gahang et al. | 379/93.27 |
| 5,553,120 | 9/1996 | Katz | 379/88.09 |
| 5,561,707 | 10/1996 | Katz | 379/88.16 |
| 5,638,425 | 6/1997 | Meador, III et al. | 379/88.01 |

METHOD AND APPARATUS FOR SPECIFYING ALPHANUMERIC INFORMATION WITH A TELEPHONE KEYPAD

BACKGROUND OF THE INVENTION

1. Field of the Invention

This invention relates to telecommunication methods and apparatus. More specifically, this invention relates to methods and apparatus for the use of telephone key pads for inputting alphabetic information.

2. Description of the Prior Art

Telephone keypads are known in the prior art (see FIG. 1). Telephone keypads have numerical keys numbered from 0 to 9, a star key, and a "#" (pound or hash or number) key. The original purpose of telephone keypads was to input the ten digits of the decimal number system into the telephone system for purposes of calling telephone numbers. Because the telephone keypad is limited to the twelve indicated keys, which are marked in the well known manner shown in FIG. 1, these keypads do not readily lend themselves to the input of the alphabet, with twenty six characters (or any other alphabet), as would a conventional alphabetic keyboard for a typewriter or word processor.

In the conventional telephone keypad, the "1" button has no letters on it. The "2" button is marked with the letters "ABC", and so forth through the "9" button, all marked in a well known manner. The "0" button is marked with "OPER" for the operator. The "*" button and the "#" button are marked only with "*" and "#", respectively.

From time to time in the use of the telephone instrument, it would be useful to input letters of the alphabet to provide alphabetic information, for example, to spell a person's name using the telephone keypad. There is no easy way to do this in the prior art, and this is a long felt frustrated need in the telecommunications industry. In theory, a number of dedicated buttons, one for each letter of the alphabet, could be added to a telephone instrument, in much the same manner as a typewriter, word processor or computer keyboard. However, in practice this is prohibitively expensive. Another solution is needed.

SUMMARY OF THE INVENTION

It is an object of the present invention to provide a system and method for using a conventional telephone keypad for inputting alphanumeric information for any purpose, including to spell a name in a convenient way, without incurring the expense of additional keys in an expanded nonconventional telephone keypad.

The present invention uses the conventional telephone keypad to input alphanumeric information, wherein the user follows directions in automatically generated audio prompts heard over the telephone, to take appropriate action to provide the necessary alphabetic information in an easy and convenient manner, for any purpose, including spelling a name.

The present invention is user friendly and requires no prior knowledge by the user of the present invention. No special telephone keypad is needed, and no special keypad template or labels are needed. No voice recognition capability is required by the present invention.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DESCRIPTION OF THE PRESENTLY PREFERRED EXEMPLARY EMBODIMENTS

Figure 1:
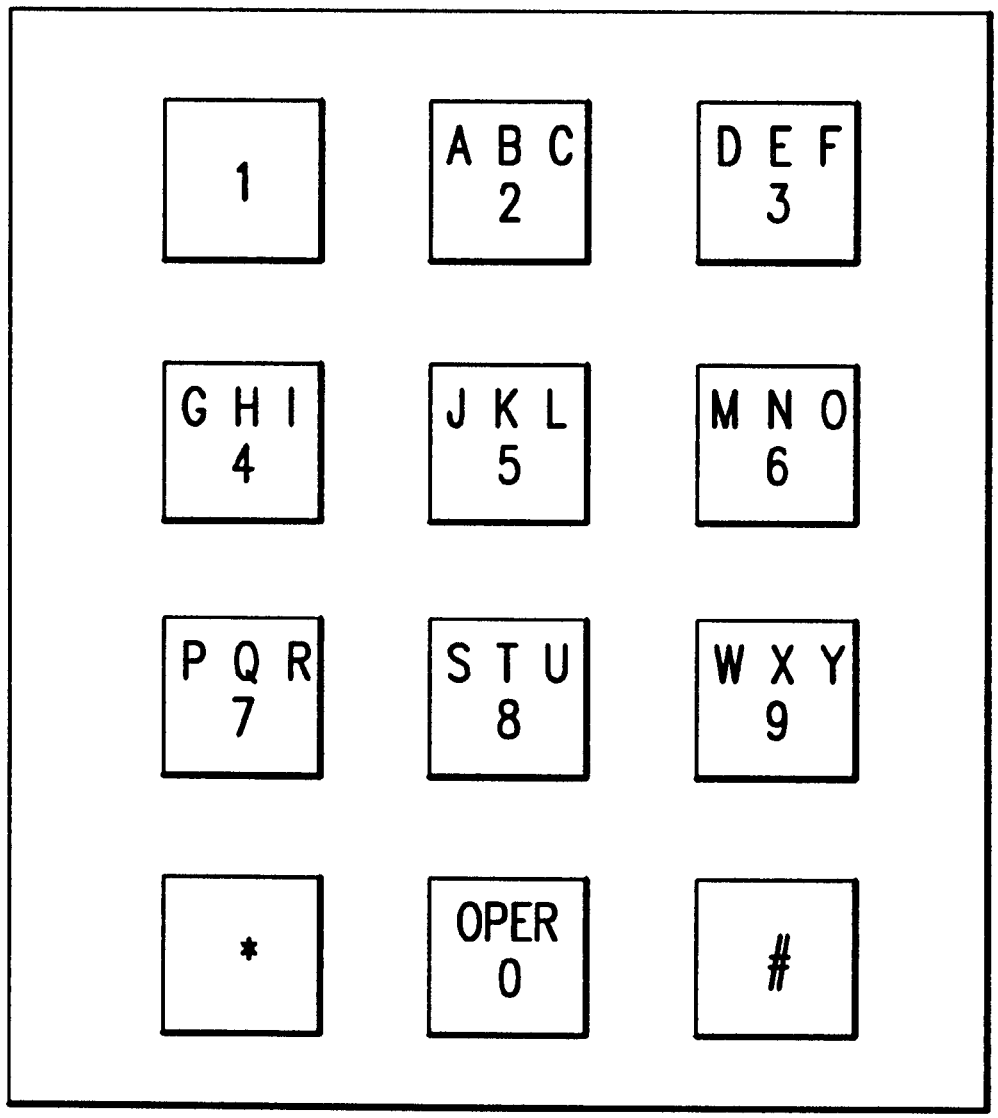
FIG. 1 shows the configuration of a standard prior art telephone keypad, as used in the present invention.

FIG. 1 shows the layout of a conventional telephone keypad as used by the present invention. Twelve keys are shown, commonly laid out in the manner shown in the drawing. The ten digits, 1 to 10, of the decimal number system are each placed in one of the ten keys, usually as shown in the drawing. The letters of the English alphabet are usually distributed over the keys in the manner shown. The letters Q and Z are usually not marked on the pad. The star symbol and pound symbol are placed on the respective keys, usually where shown in the figure.

As a specific example of a preferred embodiment, a dialog between a user and the present invention may develop as follows:

The present invention requires that the user of the telephone set give his first name, which is "STEVEN". The present invention may, with an automated audio prompt, communicate with the user over the telephone requesting "Please spell your name, by pressing the buttons on your touch-tone phone that correspond with each letter. For the letter "Q" press "7", for the letter "Z" press "9"."

At this point the user would press the keys corresponding to the numbers "7 8 3 8 3 6". Each number is pronounced to the user as each input key is pressed. The user may indicate the end of entering his or her name by a pause in inputting of at least a minimum time period or by depressing a special keypad button, such as "#", as may be directed by the automated audio prompt.

Then the present invention would deliver an audio prompt to begin to clarify the first letter, such as "if the first letter was a P, press 1; if the first letter was Q, press 2; if the first letter was an R, press 3, and if the first letter was an S, press 4." The user would then press 4 indicating that the first letter of this name was an S. In one variation of the present invention, the present invention would give an audio confirmation, "the first letter is S". (The present invention could similarly give an audio confirmation after each individual number entry.)

The present invention would then prompt "if the next letter was a T, press 1; if it was a U, press 2; if it was a V, press 3." The user would then press 1.

The present invention would then prompt "if the next letter was a D, press 1; if the next letter was an E, press 2; if the next letter was an F, press 3." The user would then press 2.

The present invention would then prompt, "if the next letter is a T, press 1; if the next letter was a U, press 2; if it was a V, press 3." The user would then press 3.

The present invention would then prompt, "if the next letter was a D, press 1; if it was an E, press 2; if it was an F, press 3." The user would then press 2.

The present invention would then prompt, "if the next letter was an M, press 1; if it was an N, press 2; and if it was an O, press 3." The user would then press 2.

The present invention would then deliver an automated audio confirmation such as, "your first name is STEVEN." The audio confirmation may pronounce the indicated name if the name is in a data bank of audio pronunciations of names, and if not, the present invention may spell out the name. In one variation of the present invention, the name is always spelled out.

The present invention has in its machine memory the correspondence between the letters and numbers on a conventional telephone keypad. That is, the present invention has recorded in machine memory that each number on the telephone keypad may correspond to any of the three letters also on that same key as the number, with the additional correspondence that 7 may also correspond to Q, and that 9 may also correspond to Z. The automated prompts are activated accordingly.

The 1 button on the touch tone telephone keypad is not used in the initial indication of a letter, and may be used only in the confirmation of the letter as indicated above.

Figure 2:
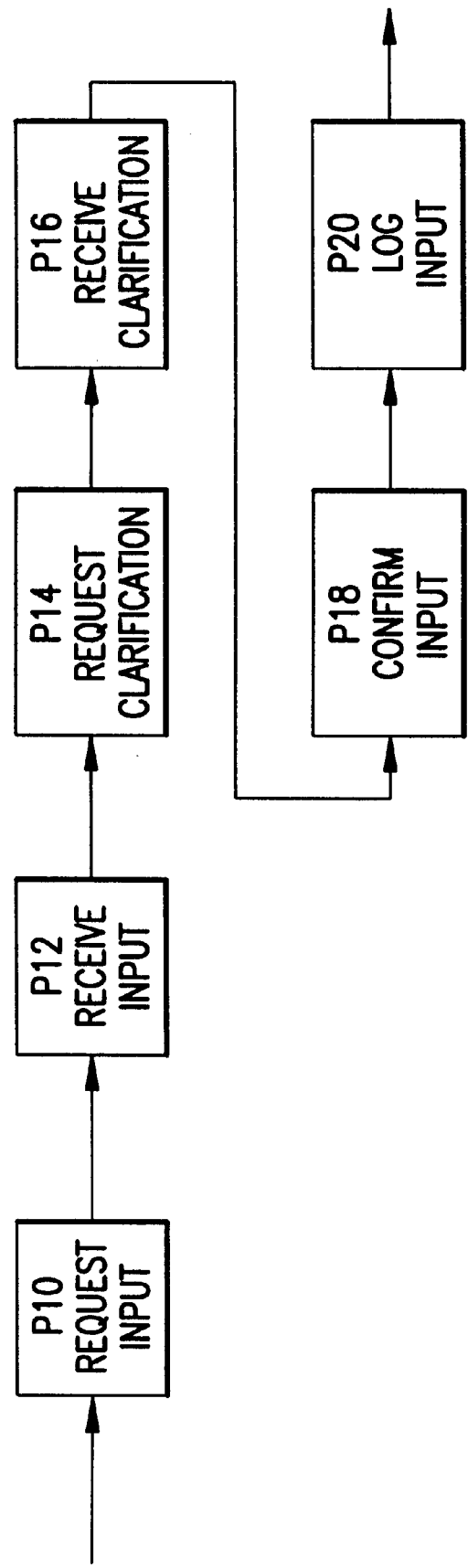
FIG. 2 shows a flow chart for the basic method of the present invention.

FIG. 2 shows a simplified flow chart for the logic of the algorithm of the present invention. The present invention first requests (at P10) of the telephone user a specified input. For example, the user's first name may be requested, as in the above example.

The present invention then receives (at P12) an input from the user from the telephone keypad as indicated in the above example, each digit of which may have the inherent ambiguity of representing at least three letters. This corresponds in the above example to receipt of the input 7 8 3 8 3 6.

The present invention may then request clarification (at P14) of the user with an audio prompt. In the above example, the series of audio prompts are to clarify each letter.

Next, the present invention receives (at P16) clarification input from the user using the telephone keypad in the manner discussed in the example above. This corresponds with the user in the above example indicating with keys 1, 2, 3, or 4 which letter that each original number in the original input corresponded to.

The present invention then confirms (at P18) the input. In the above example this constitutes the automatic audio prompt generated by the present invention to the user that his first name is STEVEN.

The present invention may then log the confirmed input (at P20) for the purposes for which it was originally requested. This can constitute storing the indicated input in the relevant computer database corresponding with this user transaction and processing it with other applications.

Figure 3:
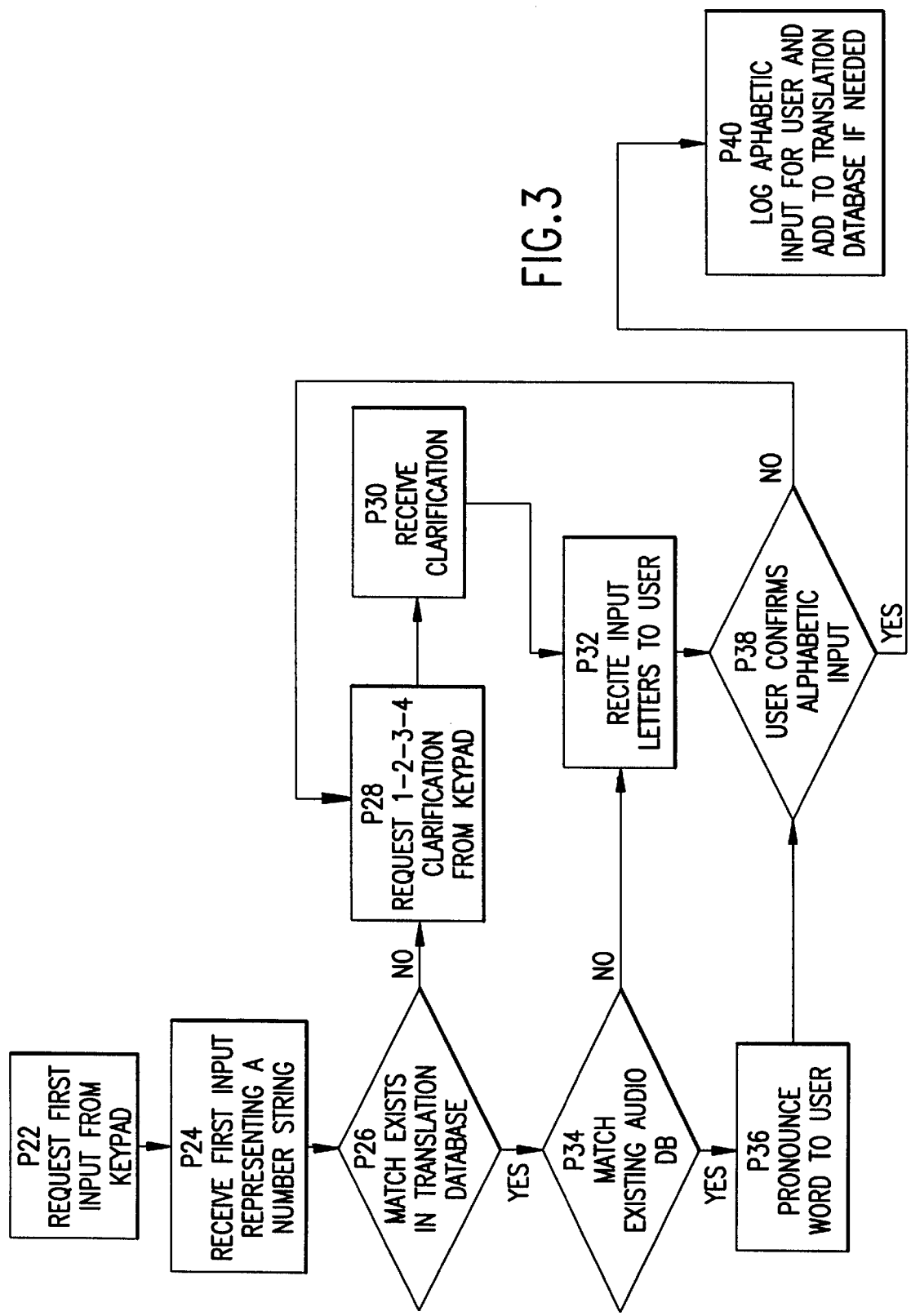
FIG. 3 shows a flow chart of a more detailed variation of the present invention.

FIG. 3 shows the logical flow chart of a variation of the present invention. To start the process, the present invention would request (at P22) input with an audio prompt to a user to input information via a keypad such as the conventional keypad shown in FIG. 1. The requested input will be in the form of a number string which, when converted to letters, may be, for example, the user's first name.

The present invention would then receive input (at P24) from the user. For example, the present invention may receive the input 7 8 3 8 3 6 from a user whose first name is STEVEN. Each number is pronounced to the user as each input key is pressed. As mentioned in the previous variation, the user may be prompted to depress the "#" button, for example, to indicate the end of input, or the end of input may be indicated by a pause of a minimum time duration.

The present invention would then query (at P26) the translation database to determine whether the input, in this case 7 8 3 8 3 6 in its original numerical form, exists in the translation database. The translation database contains, in machine memory, correlations between specific inputs in numeric form and clarified input in alphabetic form for each numeric form. After a period of use, for example, it would be likely that the translation database would indicate that 7 8 3 8 3 6 possibly correlated with STEVEN, because of prior use of 7 8 3 8 3 6 as an initial numeric input that was later clarified to STEVEN. In theory, a numeric input of N digits could be clarified to as many as $N^4$ alphabetic inputs. However, most numeric inputs of N digits that are actually given and confirmed in response to, for example, an auto-response query for a first name, would probably relate to no more than one to three first names. Therefore, the database look up will be efficient. Also, because of the log in step 7 discussed below, the translation database in use will accumulate the most common responses to any query, and hence will become more efficient with time. The translation database may be unified or segregate correlations according to the query to which each correlation was elicited in a response.

If the answer to the query (at P26) was YES and the original input was in the translation database, the present invention would then query (at P34) the audio database to determine whether the translated match from the translation database is in the audio database.

If the answer to the query (at P34) is "yes", then the present invention pronounces (at P36) the word to the user. If the answer to the query (at P34) is "no", the present invention recites the input letters (at P32) to the user.

Next, the present invention asks (at P38) the user to confirm the input. If the user confirms the input, the present invention logs the input (at P40) and adds the input to the translation database, if it is not already in the translation database.

If it is determined (at P26) that a match does not exist in the translation database, the present invention requests 1-2-3-4 clarification (at P28) of each input symbol, in the 1-2-3-4 manner indicated in the example above. The present invention receives clarification (at P30) from the keypad and proceeds to recite (at P32) the input letters to the user.

If (at P26) the present invention determines that there is more than one match in the database, each match would be announced to the user and the user requested to enter, for example, 1 to indicate that the announced name is the desired match or, for example, 2 to indicate that the announced name is not the desired match. The announced matches would be pronounced.

Another variation of the just-described embodiment includes counting the frequency of usage for each name entered during a particular time period, for example one month. The database is then updated each particular time period to keep matches for the X most-used names. The remaining least used names would then be deleted from the database and all frequency counters corresponding to each of the X most-used names will be reset to begin counting for the next time period. In this way, the name database will be prevented from growing unwieldy while storing only the most commonly used names in the database.

Figure 4:
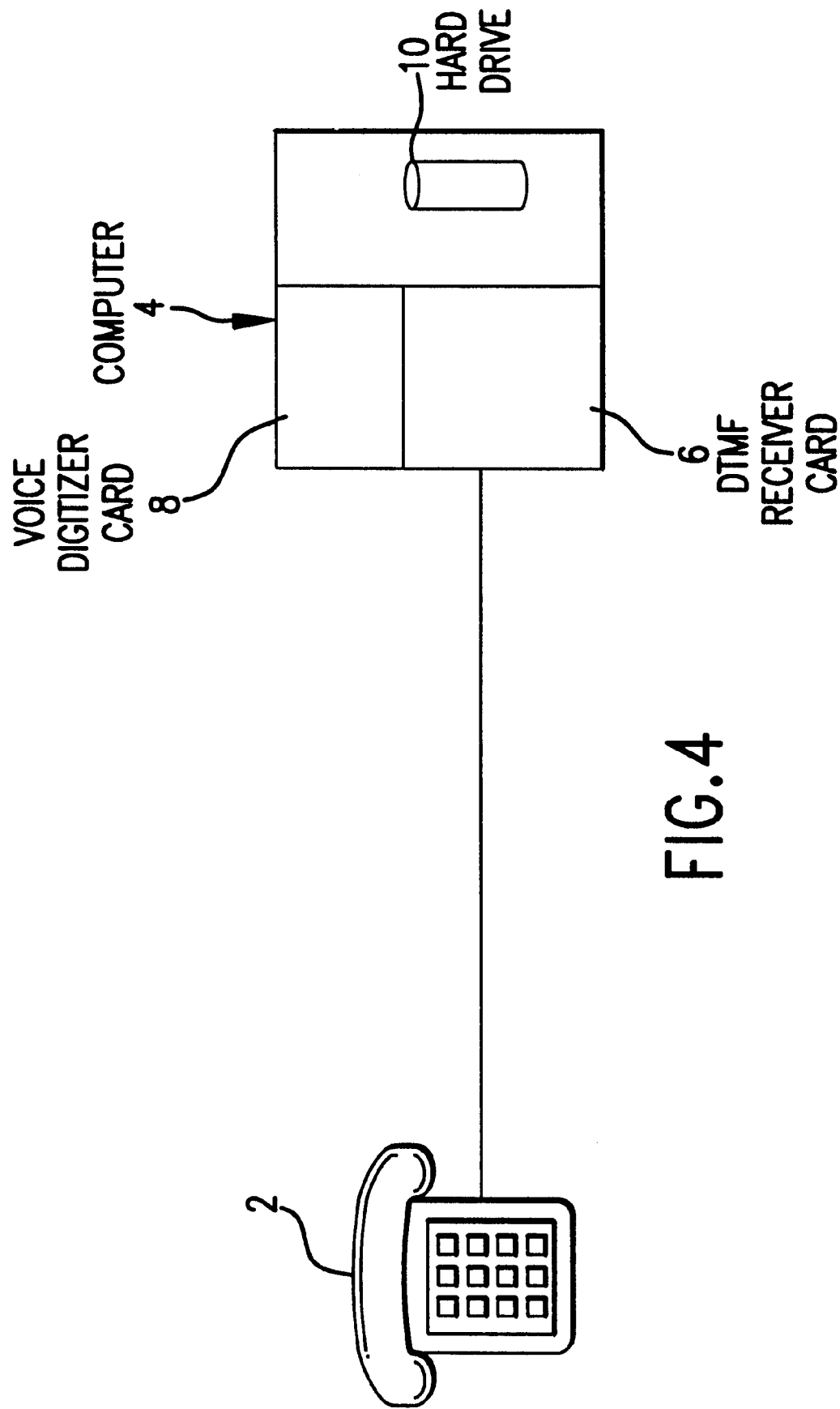
FIG. 4 shows the hardware architecture to generate the audio prompts, receive the input, store the input data for use, and hold the database correlating initial numeric responses to possible alphabetic inputs.

FIG. 4 shows the equipment used to support a preferred embodiment of the present invention.

The user makes a telephone call using a telephone 2. For example, a landline, mobile, wireless, or satellite telephone may be used. The telephone 2, preferably has a standard keypad for input, although the user could use any other device capable of producing Dual Tone Multi-Frequency (DTMF) tones, such as, for example, a handheld keypad to be placed near the telephone receiver while depressing the buttons on the handheld keypad.

A personal computer (PC) 4 answers the user's telephone call. The CPU within the PC is an Intel 386 or faster microprocessor. The PC has a minimum of 8 megabytes of Random Access Memory (RAM) and preferably 8 to 32 megabytes. The PC has a hard drive 10 with a minimum capacity of 500 megabytes and preferably 500 megabytes to 2 gigabytes. The PC includes a DTMF receiver card 6 for recognizing the tones produced by the buttons on the keypad. The PC also includes a voice digitizer card 8 to produce an automated voice to direct the user's input. The translation database and the audio database use standard commercial off-the-shelf software, such as, Microsoft Access.

Figure 5:
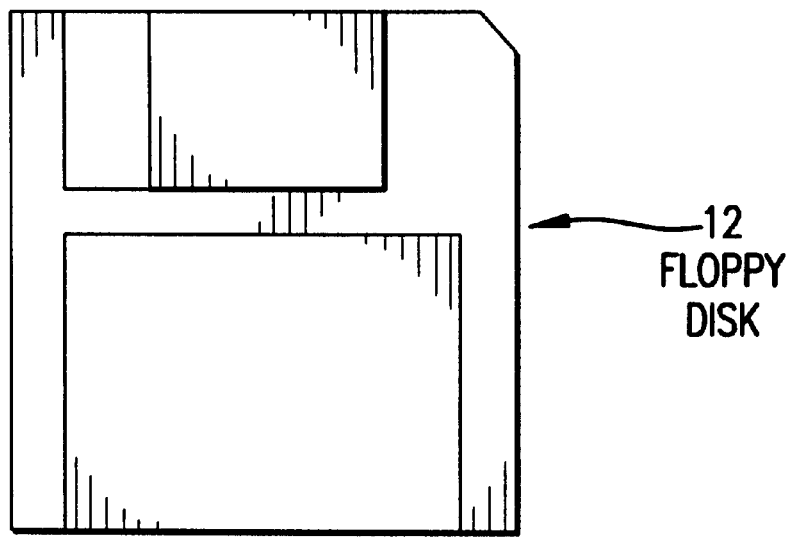
FIG. 5 shows a floppy disk as an example of a machine readable medium encoded with data representing a computer program for directing an automated communication system to perform the method of the invention.

FIG. 5 shows a floppy disk 12 as an example of a machine readable memory medium. The floppy disk 12 may contain software in the form of machine readable instructions for causing the PC 4 to carry out an embodiment of the invention.

Figure 6:
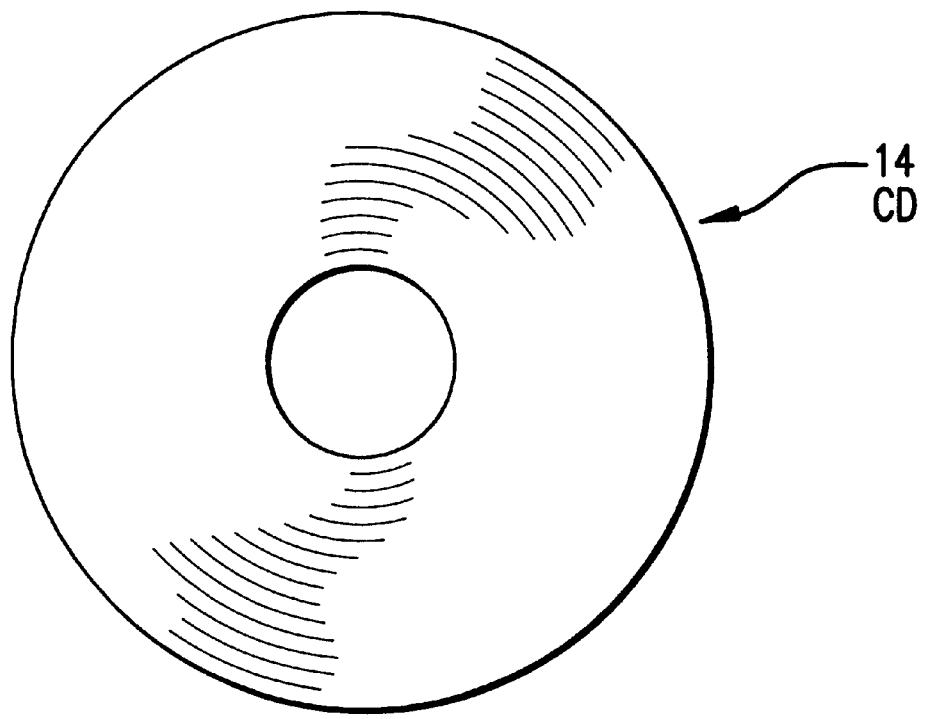
FIG. 6 shows a compact disk (CD) as an example of a machine readable medium encoded with data representing a computer program for directing an automated communication system to perform the method of the invention.

FIG. 6 shows a compact disk (CD) 14 as another example of a machine readable memory medium. The CD 14 may contain software in the form of machine readable instructions for causing the PC 4 to carry out an embodiment of the invention.

Other examples of machine readable medium include, but are not limited to, a hard disk 10, a magnetic tape, a optical disk, and a Read-Only Memory (ROM).

Figure 7:
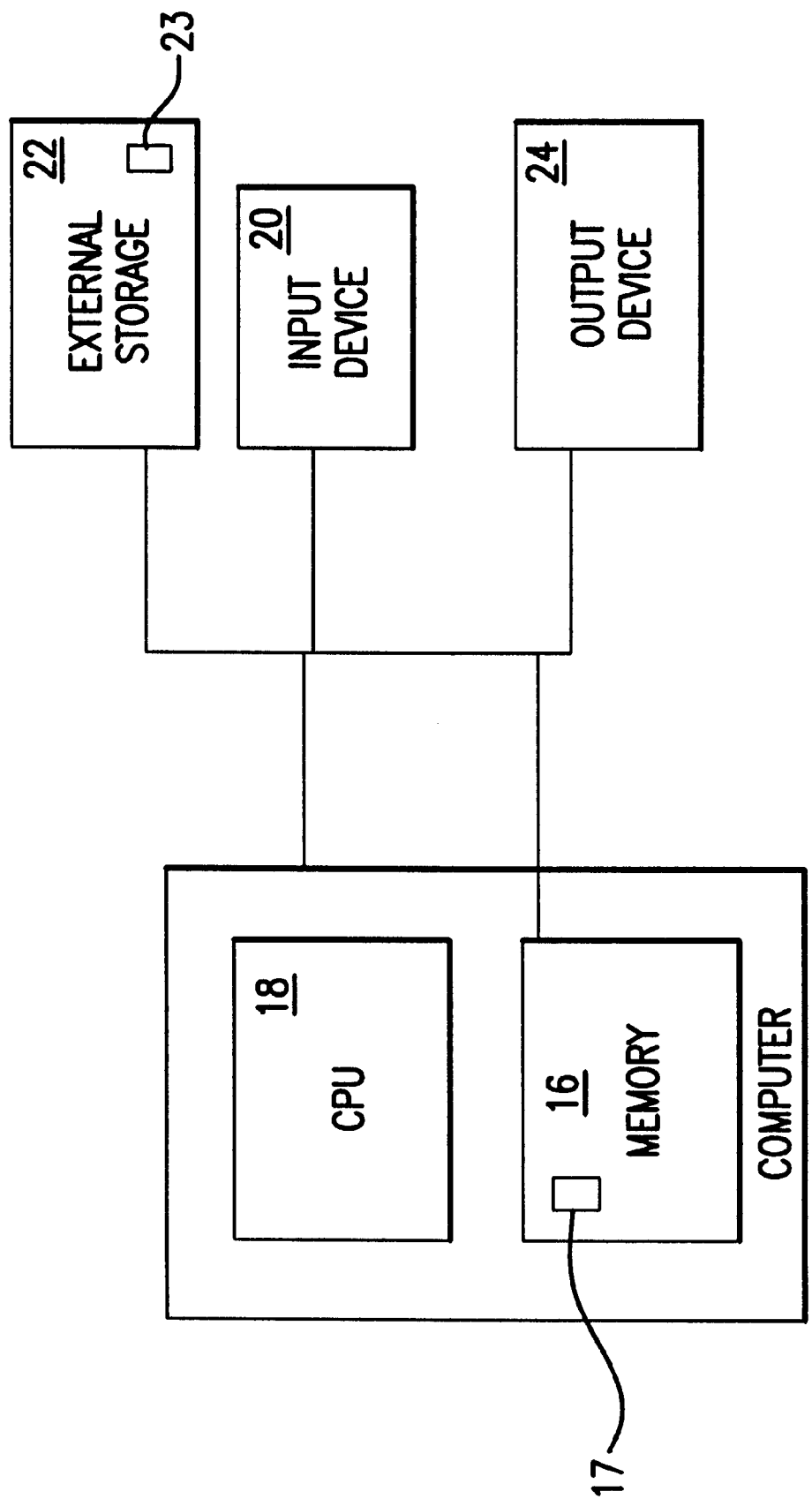
FIG. 7 shows a generic version of the hardware required for an automated audio communication system.

FIG. 7 is another example of the equipment required for the automatic audio communication system. FIG. 7 shows a computer comprising a CPU 18 and a memory 16. As mentioned above, in the preferred embodiment, the CPU is an Intel 386 or faster microprocessor, for example, an Intel 486 microprocessor or an Intel Pentium microprocessor. The memory 16 may be, for example, RAM. The memory 16, includes computer program instructions 17 for carrying out the invention. The computer is electrically connected through, for example, a data bus, to an external storage device 22, an input device 20, and an output device 24. The external storage device 22 may be, for example, a hard disk or magnetic tape, on which computer program instructions 23 for carrying out the invention are stored. The input device 20 may be, for example, a DTMF receiver card for receiving DTMF signals. The output device 24 may be, for example, a voice digitizer card to produce an automated voice to direct a user's input.

Although described with reference to a particular system and implementation, the computer aspects of the present invention can be implemented in software, hardware or any combination thereof. When implemented fully or partially in software, the invention can reside, permanently or temporarily, on any machine readable memory or storage medium, including but not limited to a RAM, a ROM, a disk, an ASIC, a PROM and the like. In addition, the invention may be implemented using circuits, without the use of software. The software may be executed by a PC, a larger computer, an ASIC, a programmable machine, a computer network, or otherwise.

The present invention can be used to specify any alphanumeric input from a telephone keypad, and need not be limited to names. Any word may be so transmitted, for example, address words, locations, employer names, or other words could be inputted. Also acronyms and alphabetic symbols could be used, such as stock trading symbols. Also non-word alphabetic input, and letters mixed with numbers could be inputted by the present invention. Names inputted might be the user's name, or other names.

The embodiments illustrated and discussed herein are intended only to teach those skilled in the art the best way known by the inventor to make and use the invention. Nothing in the specification should be considered as limiting the scope of the present invention. Changes could be made by those skilled in the art to produce equivalent devices without departing from the invention. The present invention should only be limited by the following claims and their legal equivalents.

For example, this method may be used for other alphabets on the keypad, such as the Greek or Cyrillic alphabets.

What is claimed is:

1. A method comprising:
   a. generating an input request from an automated audio communication system to request a first input, representing a number string, from a telephone keypad;
   b. receiving the first input from the telephone keypad;
   c. reciting a number to a user corresponding to each key pressed on the telephone keypad while entering the first input;
   d. checking a translation database in the automated audio communication system for a correlation between the first input and an entry in the translation database so as to convert the first input to an alphabetic string representing a name;
   e. requesting additional input from the telephone keypad for clarification of the first input when the correlation is not found in the step of checking the translation database;
   f. receiving the additional input from the telephone keypad clarifying the first input;
   g. checking an audio database, when the correlation is found in the step of checking the translation database, for the name in the audio database;
   h. pronouncing the name to a user when the name is found in the audio database;
   i. reciting each letter of the name to the user when one of the name is not found in the audio database and the additional input was requested and received from the telephone keypad;
   j. requesting the user to confirm the name via the telephone keypad;
   k. repeating the step of requesting the additional input when the user does not confirm the name;
   l. logging the name in a memory in the automated audio communication system and adding the name to the translation database if the name is not present in the translation database, when the user confirms the name;

m. counting a number of times each name is entered during a predetermined time period;

n. saving a predetermined number of most frequently used ones of the each name in the translation database based on the number of times the each name is entered during the predetermined time period; and o. deleting from the translation database the each name that is not among the predetermined number of the most frequently used ones of the each name in the translation database, wherein p. the additional input comprises at least one signal from the telephone keypad representing a number.

2. A method comprising:

a. generating an input request from an automated audio communication system to request a first input, representing a number string, from a telephone keypad;

b. receiving the first input from the telephone keypad;

c. checking a translation database in the automated audio communication system for a correlation between the first input and an entry in the translation database so as to convert the first input to an alphabetic string;

d. requesting additional input from the telephone keypad for clarification of the first input when the correlation is not found in the step of checking the translation database;

e. receiving the additional input from the telephone keypad clarifying the first input;

f. reciting each letter of the alphabetic string to a user;

g. requesting the user to confirm the alphabetic string via the telephone keypad;

h. logging the alphabetic string in a memory in the automated audio communication system and adding the alphabetic string to the translation database if the alphabetic string is not present in the translation database, when the user confirms the alphabetic string, wherein i. the additional input comprises at least one signal from the telephone keypad representing a number.

3. The method of claim 2, wherein the alphabetic string represents a name.

4. The method of claim 2, wherein the alphabetic string represents a word.

5. The method of claim 2, further comprising:

a. reciting a number to the user corresponding to each key pressed on the telephone keypad while entering the first input.

6. The method of claim 3, further comprising:

a. checking an audio database for the alphabetic string when the correlation is found in the step of checking the translation database;

b. pronouncing the alphabetic string to the user when the alphabetic string is found in the audio database, wherein c. the step of reciting each letter of the alphabetic string is performed only when one of the alphabetic string is not found in the audio database and the additional input was requested and received from the telephone keypad.

7. The method of claim 4, further comprising:

a. checking an audio database for the alphabetic string when the correlation is found in the step of checking the translation database;

b. pronouncing the alphabetic string to the user when the alphabetic string is found in the audio database, wherein c. the step of reciting each letter of the alphabetic string is performed only when one of the alphabetic string is not found in the audio database and the additional input was requested and received from the telephone keypad.

8. The method of claim 2, further comprising:

a. repeating the step of requesting the additional input when the user does not confirm the alphabetic string.

9. The method of claim 3, further comprising:

a. repeating the step of requesting the additional input when the user does not confirm the alphabetic string.

10. The method of claim 4, further comprising:

a. repeating the step of requesting the additional input when the user does not confirm the alphabetic string.

11. The method of claim 2, further comprising:

a. counting a number of times each alphabetic string is entered during a predetermined time period;

b. saving a predetermined number of most frequently used ones of the each alphabetic string in the translation database based on the number of times the each alphabetic string is entered during the predetermined time period; and c. deleting from the translation database the each alphabetic string that is not among the predetermined number of the most frequently used ones of the each alphabetic string in the translation database.

12. A machine readable memory medium encoded with data representing a computer program for directing an automated communication system to perform a method comprising:

a. generating an input request from an automated audio communication system to request a first input, representing a number string, from a telephone keypad;

b. receiving the first input from the telephone keypad;

c. reciting a number to a user corresponding to each key pressed on the telephone keypad while entering the first input;

d. checking a translation database in the automated audio communication system for a correlation between the first input and an entry in the translation database so as to convert the first input to an alphabetic string representing a name;

e. requesting additional input from the telephone keypad for clarification of the first input when the correlation is not found in the step of checking the translation database;

f. receiving the additional input from the telephone keypad clarifying the first input;

g. checking an audio database, when the correlation is found in the step of checking the translation database, for the name in the audio database;

h. pronouncing the name to the user when the name is found in the audio database;

i. reciting each letter of the name to the user when one of the name is not found in the audio database and the additional input was requested and received from the telephone keypad;

j. requesting the user to confirm the name via the telephone keypad;

k. repeating the step of requesting the additional input when the user does not confirm the name;

l. logging the name in a memory in the automated audio communication system and adding the name to the translation database if the name is not present in the translation database, when the user confirms the name;

m. counting a number of times each name is entered during a predetermined time period;

n. saving a predetermined number of most frequently used ones of the each name in the translation database based on the number of times the each name is entered during the predetermined time period; and o. deleting from the translation database the each name that is not among the predetermined number of the most frequently used ones of the each name in the translation database, wherein p. the additional input comprises at least one signal from the telephone keypad representing a number.

13. A machine readable memory medium encoded with data representing a computer program for directing an automated communication system to perform a method comprising:

a. generating an input request from an automated audio communication system to request a first input, representing a number string, from a telephone keypad;

b. receiving the first input from the telephone keypad;

c. checking a translation database in the automated audio communication system for a correlation between the first input and an entry in the translation database so as to convert the first input to an alphabetic string;

d. requesting additional input from the telephone keypad for clarification of the first input when the correlation is not found in the step of checking the translation database;

e. receiving the additional input from the telephone keypad clarifying the first input;

f. reciting each letter of the alphabetic string to a user;

g. requesting the user to confirm the alphabetic string via the telephone keypad; and h. logging the alphabetic string in a memory in the automated audio communication system and adding the alphabetic string to the translation database if the alphabetic string is not present in the translation database, when the user confirms the alphabetic string, wherein i. the additional input comprises at least one signal from the telephone keypad representing a number.

14. The machine readable memory medium of claim 13, wherein the alphabetic string represents a name.

15. The machine readable memory medium of claim 13, wherein the alphabetic string represents a word.

16. The machine readable memory medium of claim 13, the method further comprising:

a. reciting a number to the user corresponding to each key pressed on the telephone keypad while entering the first input.

17. The machine readable memory medium of claim 14, further comprising:

a. checking an audio database for the alphabetic string when the correlation is found in the step of checking the translation database;

b. pronouncing the alphabetic string to the user when the alphabetic string is found in the audio database, wherein c. the step of reciting each letter of the alphabetic string is performed only when one of the alphabetic string is not found in the audio database and the additional input was requested and received from the telephone keypad.

18. The machine readable memory medium of claim 15, the method further comprising:

a. checking an audio database for the alphabetic string when the correlation is found in the step of checking the translation database;

b. pronouncing the alphabetic string to the user when the alphabetic string is found in the audio database, wherein c. the step of reciting each letter of the alphabetic string is performed only when one of the alphabetic string is not found in the audio database and the additional input was requested and received from the telephone keypad.

19. The machine readable memory medium of claim 13, the method further comprising:

a. repeating the step of requesting the additional input when the user does not confirm the alphabetic string.

20. The machine readable memory medium of claim 14, the method further comprising:

a. repeating the step of requesting the additional input when the user does not confirm the alphabetic string.

21. The machine readable memory medium of claim 15, the method further comprising:

a. repeating the step of requesting the additional input when the user does not confirm the alphabetic string.

22. The machine readable memory medium of claim 13, the method further comprising:

a. counting a number of times each alphabetic string is entered during a predetermined time period;

b. saving a predetermined number of most frequently used ones of the each alphabetic string in the translation database based on the number of times the each alphabetic string is entered during the predetermined time period; and c. deleting from the translation database the each alphabetic string that is not among the predetermined number of the most frequently used ones of the each alphabetic string in the translation database.

23. An apparatus comprising:

a. a CPU comprising one of an Intel 386 CPU chip, an Intel 486 chip and an Intel Pentium CPU chip;

b. a random access memory having a storage capacity of at least 8 megabytes;

c. a hard disk having a capacity of at least 500 megabytes;

d. means for generating an input request from an automated audio communication system to request a first input, representing a number string, from a telephone keypad;

e. means for receiving the first input from the telephone keypad;

f. means for reciting a number to a user corresponding to each key pressed on the telephone keypad while entering the first input;

g. means for checking a translation database in the automated audio communication system for a correlation between the first input and an entry in the translation database so as to convert the first input to an alphabetic string representing a name;

h. means for requesting additional input from the telephone keypad for clarification of the first input when the means for checking the translation database cannot find the correlation;

i. means for receiving the additional input from the telephone keypad clarifying the first input;

j. means for checking an audio database, when the correlation is found by the means for checking the translation database, for the name in the audio database;

k. means for pronouncing the name to the user when the name is found by the means for checking the audio database;

l. means for reciting each letter of the name to the user when one of the name is not found in the audio database by the means for checking the audio database and the additional input was requested and received from the telephone keypad;

m. means for requesting the user to confirm the name via the telephone keypad;

n. means for re-requesting the additional input when the user does not confirm the name;

o. means for logging the name in a memory in the automated audio communication system and for adding the name to the translation database if the name is not present in the translation database, when the user confirms the name;

p. means for counting a number of times each name is entered during a predetermined time period;

q. means for saving a predetermined number of most frequently used ones of the each name in the translation database based on the number of times the each name is entered during the predetermined time period; and r. means for deleting from the translation database the each name that is not among the predetermined number of the most frequently used ones of the each name in the translation database, wherein s. the additional input comprises at least one signal from the telephone keypad representing a number.

24. An apparatus comprising:

a. means for generating an input request from an automated audio communication system to request a first input, representing a number string, from a telephone keypad;

b. means for receiving the first input from the telephone keypad;

c. means for checking a translation database in the automated audio communication system for a correlation between the first input and an entry in the translation database so as to convert the first input to an alphabetic string;

d. means for requesting additional input from the telephone keypad for clarification of the first input when the means for checking the translation database cannot find the correlation;

e. means for receiving the additional input from the telephone keypad clarifying the first input;

f. means for reciting each letter of the alphabetic string to a user;

g. means for requesting the user to confirm the alphabetic string via the telephone keypad; and h. means for re-requesting the additional input when the user does not confirm the name; and i. means for logging the name in a memory in the automated audio communication system and for adding the name to the translation database if the name is not present in the translation database, when the user confirms the name, wherein j. the additional input comprises at least one signal from the telephone keypad representing a number.

25. The apparatus of claim 24, wherein the alphabetic string represents a name.

26. The apparatus of claim 24, wherein the alphabetic string represents a word.

27. The apparatus of claim 24, further comprising:

a. means for reciting a number to the user corresponding to each key pressed on the telephone keypad while entering the first input.

28. The apparatus of claim 25, further comprising:

a. means for checking an audio database for the alphabetic string when the correlation is found by the means for checking the translation database;

b. means for pronouncing the alphabetic string to the user when the alphabetic string is found by the means for checking the audio database, wherein c. the means for reciting each letter of the alphabetic string is used only when one of the means for checking the audio database cannot find the alphabetic string and the additional input was requested and received from the telephone keypad.

29. The apparatus of claim 26, further comprising:

a. means for checking an audio database for the alphabetic string when the correlation is found by the means for checking the translation database;

b. means for pronouncing the alphabetic string to the user when the alphabetic string is found by the means for checking the audio database, wherein c. the means for reciting each letter of the alphabetic string is used only when one of the means for checking the audio database cannot find the alphabetic string and the additional input was requested and received from the telephone keypad.

30. The apparatus of claim 24, further comprising:

a. means for re-requesting the additional input when the user does not confirm the alphabetic string.

31. The apparatus of claim 25, further comprising:

a. means for re-requesting the additional input when the user does not confirm the alphabetic string.

32. The apparatus of claim 26, further comprising:

a. means for re-requesting the additional input when the user does not confirm the alphabetic string.

33. The apparatus of claim 24, further comprising:

a. a CPU;

b. a memory having a storage capacity of at least 8 megabytes; and c. an external storage device having a capacity of at least 500 megabytes.

34. The apparatus of claim 33, wherein:

a. the CPU comprises one of an Intel 386 CPU chip, an Intel 486 CPU chip and an Intel Pentium CPU chip.

35. The apparatus of claim 24, further comprising:

a. means for counting a number of times each alphabetic string is entered during a predetermined time period;

b. means for saving a predetermined number of most frequently used ones of the each alphabetic string in the translation database based on the number of times the each alphabetic string is entered during the predetermined time period; and c. means for deleting from the translation database the each alphabetic string that is not among the predetermined number of the most frequently used ones of the each alphabetic string in the translation database.

* * * * *